United States Patent [19]

de Rosa et al.

[11] 3,944,276

[45] Mar. 16, 1976

[54] ADJUSTABLE SEAT, ESPECIALLY FOR MOTOR VEHICLES

[75] Inventors: Daniel de Rosa; Jacques Lacambre, both of Boulogne-Billancourt, France

[73] Assignees: Regie Nationale des Usines Renault, Boulogne-Billancourt; Automobiles Peugeot, Paris, both of France

[22] Filed: Nov. 14, 1974

[21] Appl. No.: 523,921

[30] Foreign Application Priority Data
Dec. 13, 1973  France .............................. 73.44601

[52] U.S. Cl. ............................... 296/65 R; 297/366
[51] Int. Cl.² ............................................ B60N 1/06
[58] Field of Search ...... 296/63, 65 R, 67; 297/362, 297/366, 343

[56] References Cited
UNITED STATES PATENTS

| | | | |
|---|---|---|---|
| 1,812,067 | 6/1931 | Toncray | 296/65 R |
| 3,401,979 | 9/1968 | Putsch | 297/366 |
| 3,667,804 | 6/1972 | Yasui et al. | 297/366 |

*Primary Examiner*—Robert J. Spar
*Assistant Examiner*—Gary Auton
*Attorney, Agent, or Firm*—Fleit & Jacobson

[57] ABSTRACT

The invention relates to an adjustable seat, notably for motor vehicles, of the type comprising a bottom displaceable longitudinally on a slideway, a back having its lower end pivoted to said bottom and its upper end pivoted about a transverse shaft rigidly connected to the side walls of the passenger compartment. Each end of said transverse shaft is connected to first and second members, respectively, rigid with said side wall, and further comprises a first connecting means for said first member and a second connecting means for said second member, control means for rotating said shaft and thus produce the relative movement between said first and second connecting means, said second connecting means being mounted for rotation and translation in relation to said second member.

4 Claims, 5 Drawing Figures

ADJUSTABLE SEAT, ESPECIALLY FOR MOTOR VEHICLES

The present invention relates to seats, especially of the type used in motor vehicles, and has specific reference to an improved adjustable seat of the type comprising a bottom movable longitudinally on slideways and a back having its base pivotally mounted to the rear end of said bottom and its upper edge pivoted about a transverse axis in the form of a shaft connected to the side walls of the passenger compartment.

In seats of this general type, the angle of inclination of the back can be modified by moving the bottom longitudinally in case the bottom is pivoted about a transverse axis or the lower edge of the back is displaceable in relation to the common pivot axis of said bottom and back. However, this simplified adjustment is inadequate for obtaining a maximum driving comfort, especially if the seat is occupied by a relatively tall person.

To adapt the driver's seat to the stature of the person having to drive the vehicle, it is also known to use an adjustable set of driving pedals and also a manually adjustable steering column. However, it is desirable to avoid manual adjustments in a steering column of which the component elements are to absorb relatively high kinetic forces in case of shocks due to crashes or accidents, and it is the essential object of this invention to provide to this end an improved construction of a seat of the type broadly set forth hereinabove, wherein the shaft about which the top edge of the back can be pivoted is not only connected to the side walls of the passenger compartment but also adjustable parallel to itself.

In addition, this invention is directed to provide an adjustable seat provided with a synchronous device for controlling the movements of the ends of said transverse pivot shaft at the upper edge of the seat back, this device being free of any risk of wedging or jamming.

Furthermore, the present invention is also directed to an arrangement comprising two seats adjustable separately from each other with means for controlling synchronously the movements of the ends of the transverse pivot shaft provided at the top of the back.

According to this invention, the adjustable seat for motor vehicle constituting the subject-matter thereof is characterised in that each end of the transverse pivot shaft disposed along the top edge of the seat back is connected to a first and second members, respectively, rigid with the corresponding walls of the passenger compartment, and that it comprises a first means for connecting said shaft to said member, and a second means for connecting said shaft to said member, means for controlling the rotation of said shaft in order to produce a relative movement between said first and second connecting means, said second connecting means being mounted for rotation and translation in relation to said second member.

In a seat according to this invention, it is particularly advantageous to use to fittings connected to said first and second members rigid with the wall of the vehicle, respectively, said first fitting being rigid with an internally-toothed ring member comprising a plurality of teeth, said second fitting being rigid with an externally toothed disc rotatably mounted by means of an eccentric member carried by the transverse shaft within said internally toothed ring, the number of teeth of the toothed ring differring from the number of teeth of the toothed disc by at least one tooth.

Other features and advantages of this invention will appear as the following description proceeds with reference to the accompanying drawings, in which.

Figure 1:
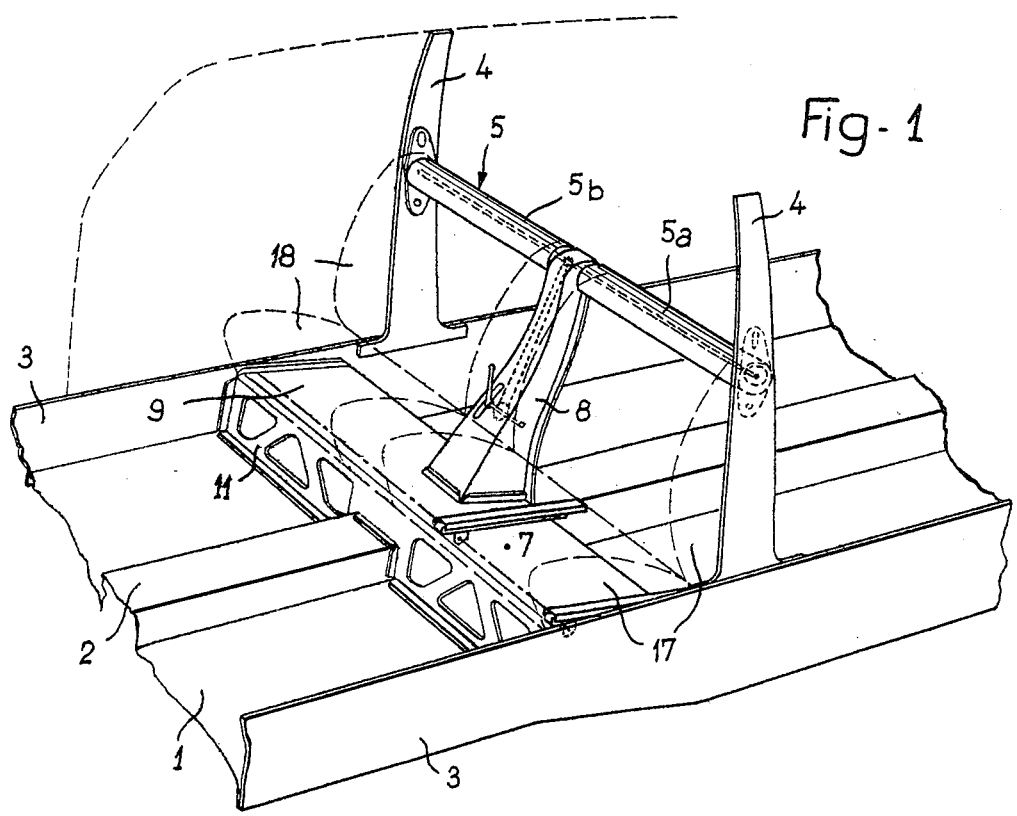
FIG. 1 is a diagrammatic perspective view of the passenger compartment of a motor vehicle with the frame structure of two separately adjustable seats.

Referring to FIG. 1, there is shown diagrammatically therein the floor 1 of the vehicle with its conventional central tunnel 2 and the longitudinal flanges 3 welded along both sides of this floor to constitute the bases of the side walls of the passenger compartment. This Figure also shows at 4 the plates lining and reinforcing the central door jambs of the vehicle body. Finally, according to a known technical contrivance, an upper cross member 5 is provided for bracing these two central door jambs and increase their strength, notably in case of lateral thrusts.

Figure 2:
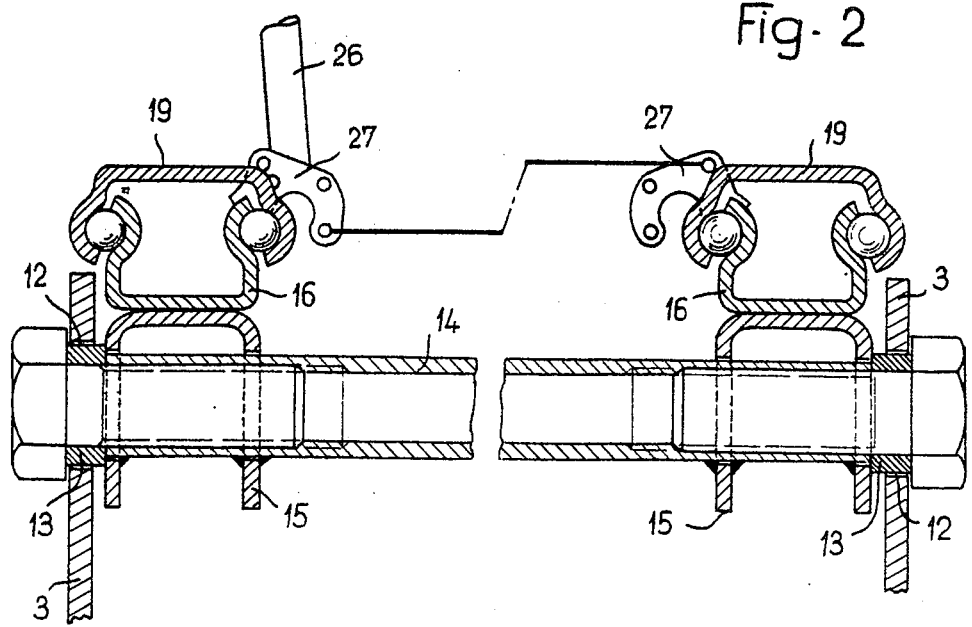
FIG. 2 is a cross-section showing the slideways equipping one of the seats illustrated in FIG. 1.

This upper cross member 5 comprises two sections 5a and 5b separated by the vertical arm 8 of the reinforcing frame structure 7 having substantially the shape of an inverted T. The horizontal member 9 of this reinforcing structure 7 is welded to the floor 1 by means of its wings 11 to constitute with said floor a box-sectioned beam bracing said lateral flanges 3. As shown in FIG. 2, the flanges 3 are apertured at 12 and provided therein with an inner ring 13. A tapped tube 14 disposed between these rings 13 carries a pair of straps 15 to which are welded a pair of fixed slideways 16 supporting the seats 17 and 18.

Figure 4:
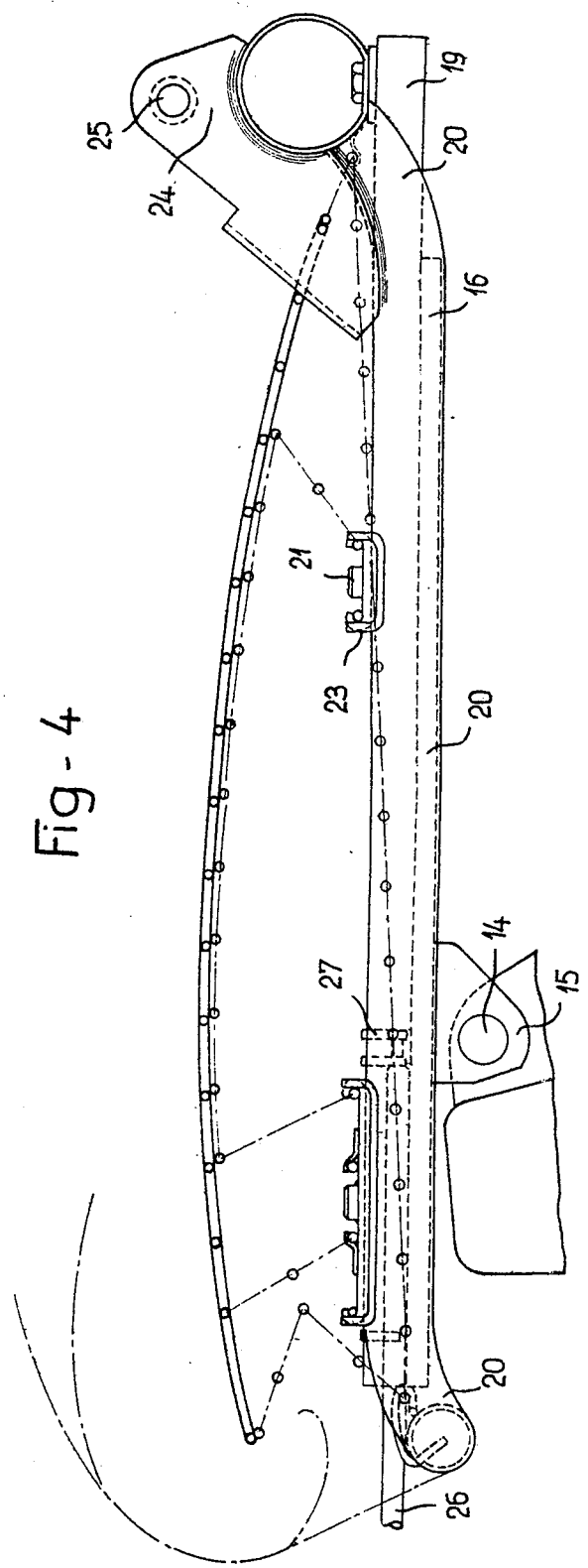
FIG. 4 is a side elevational view of the seat bottom.

The fixed slideways 16 carry each a movable slideway 19, respectively, rigid with the frame structure 20 of the adjustable seat 17 or 18. To this end, the frame structure 20 carries a number of nuts 21 welded to sheet-metal plates 23 welded in turn to the frame structure 20. These slideways 19 can thus be secured by screwing to the frame structure 20. This structure 20 also carries the gusset 24 to which a nut 25 is welded, as shown in FIG. 4. The slideway locking system comprises essentially a control rod 26 carrying bolt means 27 adapted to engage lateral slots formed in each lower slideway 16. Linkage means are provided for operatively interconnecting the bolt means 27 of the pair of upper slideways 19.

Figure 3:
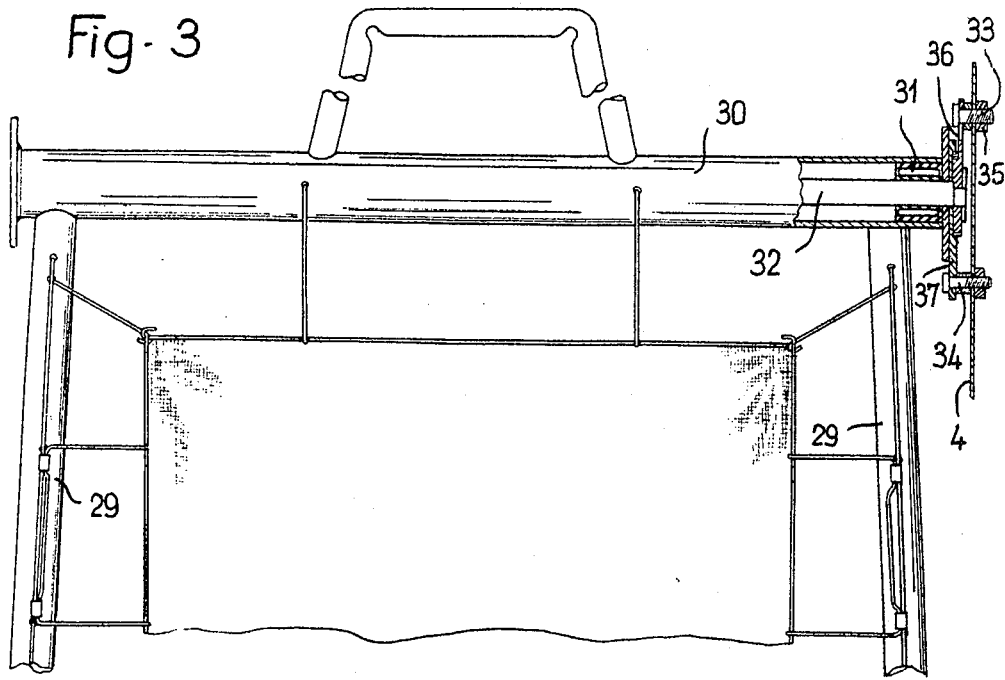
FIG. 3 is a front elevational view of the frame structure of the seat back.

Referring to FIG. 3, it will be seen that the back rest frame comprises essentially a pair of tubular uprights or side members 29 pivoted at their lower ends to the seat bottom by means of a pin having a screw-threaded portion engaging the aforesaid nut 25 and braced at their upper ends by a tube 30.

This shaft 32 carries first means 36 for connecting same to the screw 33 and second connecting means 37 for connecting same to the screw 34. Means for controlling the rotational movements of said shaft 32 comprise a driven pinion 38 having a relatively small number of teeth, which is rigid with said shaft, for example by keying or otherwise, a transmission member 39, a driving pinion 40, a control member 41 and a carrier shaft 42. This carrier shaft 42 is trunnionned in a pair of bearings rigid with the vertical arm 8 of the reinforcing frame structure 7.

The tube 30 carries a number of needle bearings 31 comprising resilient rings. Fitted in these bearings 31 is a transverse shaft 32 connected to a first member 33 and to a second member 34, respectively, these members 33, 34 consisting of a pair of screws engaging nuts 35 welded to the reinforcing plate 4 lining the central door jamb 4 of the vehicle body.

Figure 5:
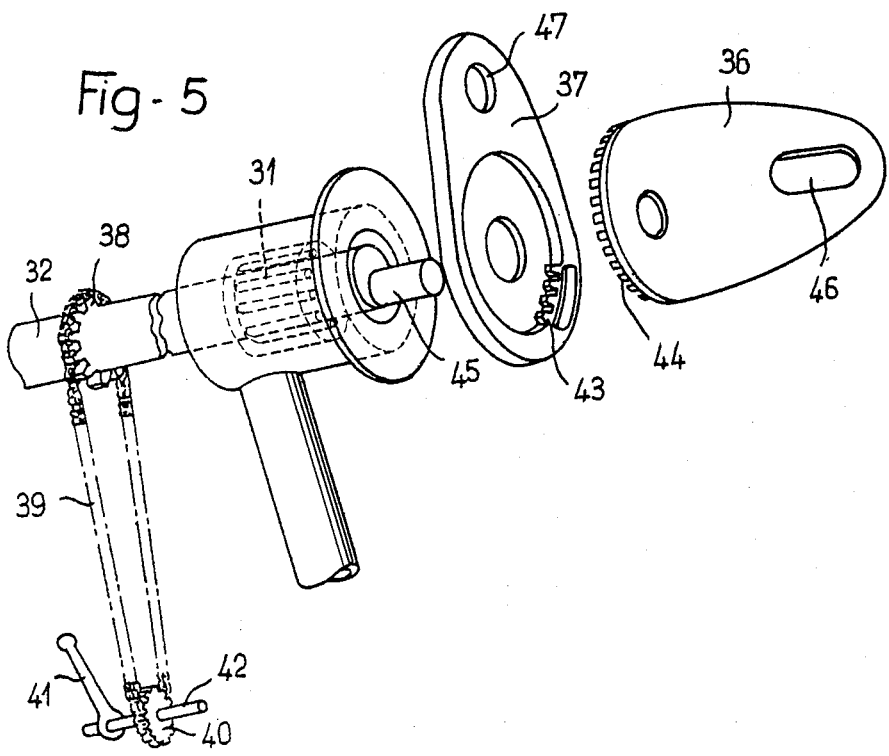
FIG. 5 is a detail view illustrating the back control system.

In a seat of this type, the connecting means 36, 37 consist of seat hinge fittings of a type known per se and briefly described just as a reminder hereinafter. The fitting 37 is rigid with an internally toothed ring 43 comprising a plurality of teeth. The other fitting 38 is rigid with an externally toothed disc 44. The first fitting 36 further comprises an elongated slot 46 engaged by said screw 33 (see FIGS. 3 and 5), and the other fitting 37 has formed therein a peripheral hole 47 engaged by the other screw 34.

Finally, the shaft 32 carries at its outer end an eccentric pin 45 engaging axial holes formed in said ring and toothed disc 43, 44, carried by said fittings 37 and 36, respectively.

If there is a difference of at least one tooth between the numbers of teeth of ring 43 and toothed disc 44, it is clear that actuating the member 41 will rotate the shaft 32 and therefore the eccentric pin 45; at the same time, this movement of eccentric pin 45 is attended by the rotation of the toothed disc 44 and ring 43 in relation to each other, thus causing a relative displacement of fittings 36, 37 and also of shaft 32, since the points connecting said fittings 36, 37 to the wall structure of the passenger compartment are fixed. To this end, the fitting 36 is mounted for both rotation and translation on member 33, due to the presence of an elongated slot 46.

As clearly shown in FIG. 1, the adjustable seat according to this invention may conveniently be associated with another seat of same type. The side faces of the backs of each seat may advantageously be disposed close to one of the side walls of the passenger compartment and also to the intermediate or central reinforcing structure 8 in order to reinforce the compartment itself while protecting the passengers of the vehicle in case of lateral shocks.

Although a specific form of embodiment of this invention has been described hereinabove and illustrated in the accompanying drawings, it will readily occur to those skilled in the art that various modifications and changes may be brought thereto without departing from the scope of the invention as set forth in the appended claims.

What is claimed as new is:

1. Adjustable seat, notably for motor vehicle, of the type comprising a bottom displaceable longitudinally on a slideway, a back rest having its lower edge hingedly connected to said bottom and its upper edge hingedly connected to a transverse shaft rigidly secured to the side walls of the passenger compartment, each end of said transverse shaft being connected to a first member and to a second member, said members being rigid with the lateral wall of the passenger compartment, said seat further comprising a first means for connecting said shaft to said first member and a second means for connecting said shaft to said second member, control means for rotating said shaft and thus produce a relative movement between said first and second connecting means, said second connecting means being mounted for rotation and translation in relation to said second member.

2. Seat as set forth in claim 1, wherein said first and second connecting means comprise a pair of fittings connected to said first and second members, respectively, and that the control means aforesaid comprises a driven pinion having a relatively small number of teeth and rigidly connected to said transverse shaft and drivingly connected to a driving pinion.

3. Seat as set forth in claim 1, wherein the transverse shaft connected to the side walls of the vehicle body carries an eccentric pin adapted to be rotated by means of said driven pinion, the relative movement between said first and second connecting means being obtained through the meshing engagement of a toothed ring and pinion carried by said second and first means, respectively, said ring and pinion having different teeth numbers.

4. Seat as set forth in claim 1, associated with another seat, in side by side relationship, the side portions of the backs of each seat being disposed close to one side wall of the passenger compartment and with a reinforcing element of the frame structure of the vehicle which is disposed between said seats.

* * * * *